Figures 1, 2, 3:
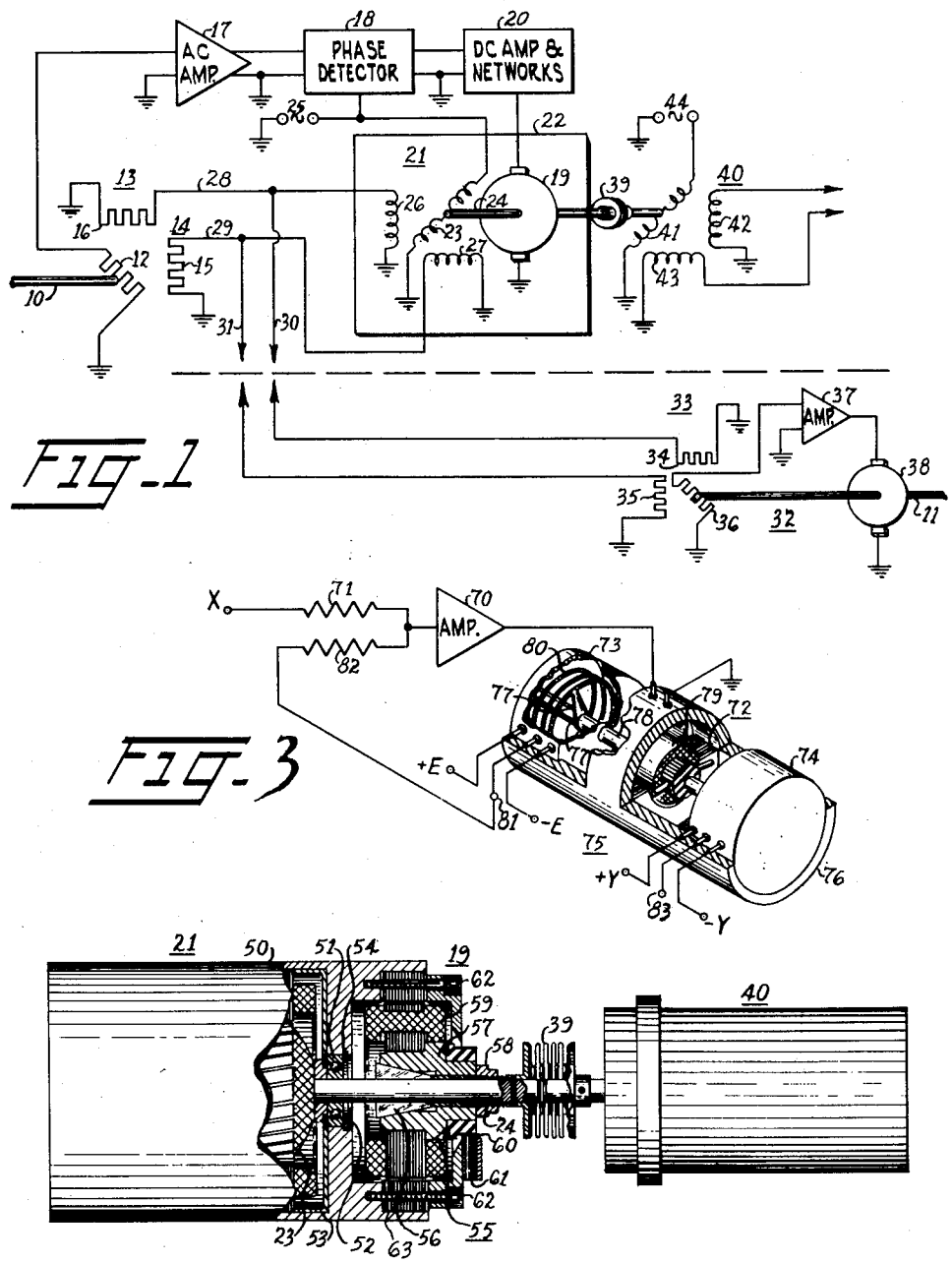

March 21, 1961  R. D. McCOY  2,976,467
PRECISION SERVO POSITIONING SYSTEM
Filed Sept. 29, 1958

INVENTOR
Rawley D. McCoy
BY
AGENT

United States Patent Office 2,976,467
Patented Mar. 21, 1961

2,976,467

PRECISION SERVO POSITIONING SYSTEM

Rawley D. McCoy, Bronxville, N.Y., assignor to Reeves Instrument Corporation, Garden City, N.Y., a corporation of New York Filed Sept. 29, 1958, Ser. No. 763,905

19 Claims. (Cl. 318—30)

This invention relates to servo systems and more specifically to instrumentation servos of the type wherein an output member is required to follow a variable input signal with a very high degree of accuracy.

The accuracy and stability requirements imposed on instrumentation servos are becoming increasingly severe with the advancement of inertial guidance and other position computing systems. In these precise systems a requirement is often encountered that a remote output shaft follow a moving input shaft with a maximum allowable error not exceeding one second of arc. Where the velocity of the input shaft is constantly changing, conventional servo systems have been found inadequate to position the remote output shaft with the required accuracy. If a closed-loop system of the type having a feedback device coupled to a servo motor through a train of reduction gears is employed, the speed of response and the maximum obtainable speed are adversely effected if the gear reduction ratio between the servo motor and output device is too large. Conversely, smoothness and stability of the servo are impaired if the gear ratio is too low. In addition, the problems introduced by gear backlash and compliance cannot be completely overcome even with the use of precision gears and anti-backlash devices. Backlash in the gearing between the servo motor and feedback element produces non-linear errors at the output shaft and also contributes toward instability in the servo loop. The adverse effect of backlash on stability severly limits the amount of gain which can be incorporated in the servo amplifier thereby reducing the accuracy of the overall system. Another cause of inaccuracies in servo positioning systems is friction resulting from the bearings used in conventional gear trains.

Accordingly, it is a principal object of this invention to provide an improved, highly accurate, servo system.

Another object is to provide an improved closed-loop instrument servo system having a high torque-to-inertia ratio without the use of reduction gearing.

Still another object is to provide a closed-loop servo system having a relatively wide bandwidth, low friction torque, and greatly improved accuracy and stability wherein the feedback element and driving member comprise an integral unit.

Another object is to provide a novel electromechanical unit for use in closed-loop servo systems having a greatly reduced compliance between the driving member and the driven feedback element.

A further object of the invention is to provide a precision servo system having a greatly increased velocity and acceleration gain.

Yet another object is to provide a highly accurate servo positioning system which is relatively simple, requires a minimum amount of maintenance, and will operate satisfactorily for long periods of time.

The foregoing objects are achieved by this invention in which an electromechanical unit comprising a motor having a high torque-to-inertia ratio, hereinafter referred to as a torque motor, and an associated feedback element form an integral part of a closed-loop servo system. In one embodiment of the invention this unit includes a motor and a precision two-pole resolver, the armature of the torque motor and the resolver rotor being rigidly mounted upon a common shaft. The motor is excited through a high-gain amplifier from an input transducer such as a resolver, synchro or other suitable position responsive device. The servo loop is closed by connecting the two-pole resolver of the electromechanical unit to the input transducer. Output data may be taken either directly from the feedback resolver or from additional resolvers coupled to the common shaft of the electromechanical unit. In another embodiment of the invention the electromechanical unit consists of a torque motor and potentiometers used in conjunction with a D.-C. amplifier to provide a precision analog multiplier.

The above objects and the brief introduction to the present invention will be more fully understood and further objects and advantages will become apparent from a study of the following detailed description in connection with the drawings wherein:

Fig. 1 depicts schematically a data transmission system in accordance with the invention, Fig. 2 is a sectional view of the electromechanical unit of the system of Fig. 1 showing details of its construction, and, Fig. 3 shows an analog multiplier circuit embodying the invention.

Referring to Fig. 1, there is shown a data transmission system which may be used to accurately repeat the position of an input shaft 10 at a remote output shaft 11. Input shaft 10 is coupled to the rotor 12 of an input transducer 13. Transducer 13 may be any suitable device having high accuracy, such as the Reeves Instrument Corporation Model R610 multipole resolver or a multipole position measuring transformer of the type disclosed in Patent 2,799,835 issued to R. W. Tripp, et al. on July 16, 1957. In the position measuring transformer of the type disclosed in the Tripp patent the rotor 12 and stator 14 are parallel discs made of a non-ferromagnetic and non-conducting material such as glass. Multiple windings comprising series-connected silver conductors are formed on the adjacent surfaces of the glass discs thus providing inductive coupling between the rotor 12 and stator 14 when current is passed through one of the windings. Rotor 12 has a single winding while stator 14 is equipped with two windings 15 and 16 arranged in space quadrature.

The single winding of rotor 12 is connected to an A.-C. amplifier 17 having its output rectified by a phase detector 18. The output of detector 18 is applied to a D.-C. torque motor 19 through a conventional D.-C. amplifier 20 having stabilization networks in its input and feedback paths. The torque motor 19 and a two-pole resolver 21 form an integral electromechanical unit 22. The output voltages of unit 22 correspond to the angular position of the rotating winding 23 of resolver 21 while its input voltage corresponds to the difference between the position of input shaft 10 and the position of rotor 23. The armature of torque motor 19 and rotor 23 are rigidly mounted upon shaft 24 so that their relative angular positions remain fixed as shaft 24 rotates.

Rotor winding 23 is excited from a reference voltage source 25 which is also applied to phase detector 18. Stator winding 26 of feedback resolver 21 is connected to stator winding 16 of transducer 13 and stator winding 27 is coupled to the other transducer stator winding 15. Resolver 21 preferably has a step-down ratio from rotor to stator thereby assuring that the resolver will be essentially insensitive to output load changes and, therefore, will have good line driving capabilities. In addition, step-down transformers (not shown) may be introduced in the leads 28 and 29 between resolver 21 and the stator windings 15 and 16 of transducer 13, if desired.

The voltages across stator windings 26 and 27 correspond to the angular position of shaft 24 and are coupled over leads 30 and 31 to a remote receiver 32. Impedance matching transformers also may be inserted in leads 30 and 31, if required for a particular application. Receiver 32 comprises a transducer 33 which as shown is similar to input transducer 13, but may be any other device suitable for converting voltage to a mechanical displacement. Leads 30 and 31 are coupled respectively to stator windings 34 and 35 of transducer 33 while the error voltage across rotor winding 36 is connected through amplifier 37 to a motor 38. The motor output shaft 11 is coupled directly to rotor 36 thus precisely positioning remote output shaft 11 in accordance with the position of shaft 24.

Connecting the remote receiver across stator windings 26 and 27 of resolver 21 provides extremely good accuracy but the number of remote receivers that can be so connected is limited by their total loading effect. A plurality of receivers may be energized, however, by coupling additional resolvers or other data repeating devices through a coupler 39 to the shaft of electromechanical unit 22. In Fig. 1, a two-pole resolver 40 is shown having its rotor 41 coupled to shaft 24. Stator windings 42 and 43 provide positional output voltages for driving other remote receivers. Rotor winding 41 may be excited from source 25 or it may be independently excited from a second reference voltage source 44. The use of additional resolvers or other data repeaters coupled to shaft 24 permits a large number of receivers to be operated, provides electrical isolation of the closed-loop portion of the system, and permits the use of any desired excitation frequency.

Details of the electromechanical unit 22 are shown in the partial sectional view of Fig. 2. An integral housing 50 encloses the unit including motor 19 and resolver 21, shaft 24 being supported by a first set of ball bearings 51 and a second set of bearings (not shown) located at the left end of resolver rotor 23. Ball bearings 51 are positioned within the aperture 52 in end bell 53 and are secured therein by a snap ring 54. Armature 55 of motor 19 is secured directly to shaft 24 by an inner sleeve 56 which is tapered at one end and threaded at the other.

The tapered portion of sleeve 56 is provided with radial slots so that the inner circumferential surface of the sleeve grips shaft 24 as the sleeve is pulled toward the right against armature core 57 by rotation of nut 58 on the threaded portion of sleeve 56. Armature coil 59, wound on core 57 is connected to the conducting bars of a commutator 60. Brushes, one of which is shown in Fig. 2 designated by the numeral 61, are fastened to housing 50 by screws 62 inserted through holes in field structure 63. Field structure 63 comprises an annular ring having a plurality of permanent magnetic pole pieces inserted around its periphery to provide a magnetic field linking armature winding 59. While a D.-C. motor has been described and shown in Figs. 1 and 2 it is evident that an A.-C. motor having a high torque-to-inertia to velocity ratio might also be used.

When the position of shaft 24 of Fig. 1 corresponds to that of input shaft 10, no voltage will appear across the rotor winding 12 of transducer 13. Any angular displacement of input shaft 10 with respect to shaft 24 will produce an A.-C. voltage which, after amplification and rectification, is fed to D.-C. motor 19 thereby driving resolver 21, through shaft 24, until the error voltage across rotor 12 is reduced to zero. The position of shaft 24 will then correspond to that of input shaft 10.

Since transducer 13 is a multipole device, the shaft 10 will have a plurality of discrete angular positions relative to shaft 24 at which the error voltage across the winding of rotor 12 will be zero. Thus, there will be a plurality of discrete angular positions to which the output shaft may be set with respect to any given position of input shaft 10. This ambiguity may be eliminated by the use of a conventional coarse or one-speed synchro or data link.

The integral mechanical coupling between the armature of motor 19 and the rotor 23 of resolver 21 eliminates the gear backlash, compliance, and friction normally found in conventional servo controlled systems and enables the open-loop gain of the A.-C. amplifier 17 and D.-C. amplifier 20 to be increased. More accurate control of the positioning of the output shaft 11 in accordance with the movement of input shaft 10 is thereby obtained. The improved servo positioning system of Fig. 1 not only possesses much higher velocity and acceleration error coefficients than are obtainable in the conventional servo positioning system, but it also possesses both a higher frequency response and a greater operational reliability.

A precision analog multiplying device embodying the principles of the invention is shown in Fig. 3. In this device, one of two voltages to be multiplied, X, is applied to the input of a high-gain amplifier 70 through an input resistor 71. The output of amplifier 70 is connected to a torque motor 72 which, together with multiturn potentiometers 73 and 74, comprise an integral electromechanical unit 75 enclosed in a housing 76. The rotating arm 77 of potentiometer 73 is mechanically coupled by a shaft 78 to the rotor 79 of motor 72 thereby providing a rigid, low compliance coupling between the motor and feedback elements. One terminal of the stationary resistive element 80 of potentiometer 73 is connected to a constant reference voltage source having a magnitude +E while the other end is connected to a voltage having a magnitude −E. The voltage on the arm 77 of potentiometer 73, therefore, can be made to vary between +E and −E by rotation of motor 72. The arm of potentiometer 73 is connected through terminal 81 and resistor 82 to the input of amplifier 70 thereby providing negative feedback. Thus, motor 72 will position shaft 78 until the voltage at the input of amplifier 70 is zero, the position of shaft 78 then being proportional to the applied voltage X.

In order to multiply the voltage X by a second voltage Y, the resistive element of potentiometer 74 is connected between voltage sources +Y and −Y. since the arm of potentiometer 74 is coupled to shaft 78, having a displacement proportional to X, the voltage at output terminal 83 will be proportional to the product XY.

A significant feature of this invention is that it provides a stable servo positioning system having exceptionally high accuracy. An integral electromechanical feedback unit, without gearing, is furnished thereby eliminating the stability and accuracy problems associated with conventional coupling methods. The unit is relatively simple to construct, easy to maintain, and permits highly accurate computations and transmission of data.

As many changes could be made in the above construction and many different embodiments could be made without departing from the scope thereof, it is intended that all matter contained in the above description or shown in the accompanying drawing shall be interpreted as illustrative and not in a limiting sense.

What is claimed is:

1. A precision servo-positioning system comprising input means responsive to an applied positioning signal and to a positional feedback signal; an electromechanical feedback unit including a housing, a shaft mounted for rotation within said housing, motor means located within said housing having a rotor mounted on said shaft and a stator surrounding said rotor, positional feedback means having a rotating element mounted on said shaft adjacent said rotor and a stationary element located within said housing adjacent said rotating element, said positional feedback means producing a positional feedback signal corresponding to the angular position of said shaft; means coupling said positional feedback signal to said input means; and means coupling the output from said input means to said motor means.

2. The precision servo-positioning system as defined in claim 1 wherein the rotating and stationary elements of said positional feedback means comprise inductively coupled windings, one of said windings being excited from a source of alternating voltage and the other of said windings producing an output voltage corresponding to the angular position of said shaft.

3. The precision servo-positioning system as defined in claim 1 wherein the stationary element of said positional feedback means comprises a resistive element and the rotating element of said positional feedback means comprises an arm conductively engaging said resistive element, the voltage on said arm corresponding to the angular position of said shaft.

4. A precision servo-positioning system comprising input means responsive to an applied positioning signal and to a positional feedback signal; an electromechanical feedback unit including a housing, motor means having an annular stator located within said housing, positional feedback means having an annular stationary element located within said housing adjacent said stator, shaft means adapted for rotation within said annular stator and said annular stationary element, said shaft means having first and second rotors mounted in adjacent relationship thereon, said first rotor being surrounded by the stator of said motor means and said second rotor being adjacent the stationary element of said positional feedback means; means coupling said positional feedback means to said input means; and means coupling the output from said input means to said motor means.

5. A precision servo-positioning system comprising input transducer means having a movable member and a fixed member, said input transducer means being responsive to the displacement between said movable member and said fixed member and to an applied positional feedback signal; an electromechanical feedback unit including a housing, a shaft mounted for rotation within said housing, motor means located within said housing having a rotor mounted on said shaft and a stator surrounding said rotor, positional feedback means having a rotating winding mounted on said shaft adjacent said rotor and a fixed winding inductively coupled to said rotating winding located within said housing, said positional feedback means producing a positional feedback signal corresponding to the angular displacement of said shaft, means coupling said positional feedback signal to said input transducer; and means coupling the output of said input transducer to said motor means.

6. A precision servo-positioning system comprising input transducer means having a movable member and a fixed member, said input transducer means being responsive to the displacement between said movable member and said fixed member and to an applied positional feedback signal; an electromechanical feedback unit including a housing, motor means having an annular stator located within said housing and having a rotor adapted for rotation within said annular stator, positional feedback means having a rotating winding rigidly coupled to said rotor thereby maintaining a fixed spatial relationship therewith and having a stationary winding located within said housing inductively coupled to said rotating winding, said positional feedback means producing a positional feedback signal corresponding to the angular displacement of said rotating element; means coupling said positional feedback signal to said input transducer; and amplifying means coupling the output of said input transducer to said motor means.

7. A precision servo-positioning system comprising an electromechanical unit including a housing, a shaft mounted for rotation within said housing, motor means located within said housing having a rotor mounted on said shaft and a stator surrounding said rotor, positional feedback means having a rotating arm affixed to said shaft adjacent said rotor and a fixed impedance element mounted within said housing conductively engaged by said rotating arm, amplifying means adapted for coupling an input signal to said motor means, and means coupling the rotating arm of said positional feedback means to the input of said amplifying means.

8. A precision servo-positioning system as defined in claim 7 wherein a second rotating arm is affixed to said shaft and a second fixed impedance element adapted for excitation by a second input signal is mounted for conductive engagement with said second rotating arm, the signal on said rotating arm being proportional to the product of said first and second input signals.

9. In a closed-loop servo system for positioning an output shaft in accordance with an input signal, the combination comprising an electromechanical unit including a housing, motor means having an annular stator mounted within said housing and a rotor adapted for rotation within said stator, positional feedback means having a fixed element located within said housing and a rotating element electrically coupled to said fixed element, said rotating element being mechanically coupled to said rotor thereby maintaining a fixed spatial relationship therebetween, and means adapted for coupling said rotor and said rotating element to said output shaft, said combination being adapted to respond to the difference between said input signal and the output of said positional feedback means.

10. In a closed-loop servo positioning system including an input shaft, an output shaft, and input means responsive to the position of said input shaft and to an applied positional feedback signal, the combination comprising an electromechanical unit including a housing, motor means having a stator mounted within said housing and a rotor adapted for rotation within said stator, positional feedback means including a fixed element located within said housing and a rotating element electrically coupled to said fixed element, means mechanically coupling said rotating element to said rotor thereby maintaining a fixed spatial relationship therewith, means adapted for coupling said input means to said motor means, and means adapted for coupling said positional feedback means to said output shaft and to said input means.

11. A precision data transmission system comprising in combination; input means responsive to applied position data and to a positional feedback signal; an electromechanical feedback unit including a housing, a shaft mounted for rotation within said housing, motor means located within said housing having a rotor mounted on said shaft and a stator surrounding said rotor, positional feedback means having a rotating element mounted on said shaft adjacent said rotor and a stationary element located within said housing adjacent said rotating element, said positional feedback means producing a positional feedback signal corresponding to the angular position of said shaft; means coupling said positional feedback signal to said input means; means coupling the output from said input means to said motor means; remote transducer means having a stationary element and a rotating element; electromotive means coupled to the rotating element of said remote transducer means; means electrically coupling the positional feedback signal from said positional feedback means to one of the elements of said remote transducer means; and amplifier means electrically coupling the other element of said remote transducer means to said electromotive means.

12. An electromechanical unit comprising in combination, a cylindrical housing, first potentiometer means having a fixed resistive element mounted within said housing and having a rotatable element electrically engaging said fixed resistive element, second potentiometer means having a second fixed resistive element mounted within said housing and being displaced longitudinally relative to the fixed resistive element of said first potentiometer means, said second potentiometer means including a second rotatable element electrically engaging said second resistive element, shaft means coaxially mounted within said housing for rotation about its longitudinal axis, said shaft means rigidly coupling the rotatable element of said first potentiometer means to the rotatable element of said second potentiometer means, and motor means having a stator mounted within said housing at a position between said first and second potentiometer means and having a rotor adapted for rotation within said stator rigidly mounted upon said shaft means.

13. An electromechanical unit comprising in combination, a cylindrical housing, shaft means coaxially situated within said housing, first and second bearing means situated within said housing and being longitudinally displaced for mounting said shaft means for rotation about its axis, motor means situated within said housing, said motor means having a rotor mounted on said shaft means and having a stator surrounding said rotor and attached to said housing, and a position responsive means situated within said housing, said position responsive means having a rotating element mounted on said shaft means adjacent said rotor and having a stationary element surrounding said rotor and attached to said housing.

14. A precision servo-positioning system comprising input means responsive to an applied positioning signal and to a positional feedback signal; an electromechanical feedback unit including motor means having an annular stator and having a rotor supported for rotation within said stator, positional feedback means having a stationary element and a rotatable element electrically coupled thereto, said rotatable element being adapted for rotation within said stationary element and being attached to said rotor thereby maintaining a fixed spatial relationship therebetween, means attaching said stationary element to said stator; means coupling said positional feedback means to said input means; means coupling the output of said input means to said motor means; and output means coupled to said positional feedback means, said output means providing an output signal corresponding to said applied positioning signal.

15. The precision servo-positioning system as defined by claim 14 wherein said input means comprises a position responsive electromechanical transducer.

16. The precision servo-positioning system as defined by claim 14 wherein said input means responsive to an applied positioning signal and to a positional feedback signal comprises an amplifier means.

17. The precision servo-positioning system as defined by claim 14 wherein said output means coupled to said positional feedback means includes a position responsive electromechanical transducer, said position responsive electromechanical transducer providing an output voltage corresponding to said applied positioning signal.

18. The precision servo-positioning system as defined by claim 14 wherein said output means coupled to said positional feedback means includes a shaft, and wherein the angular position of said shaft corresponds to said applied positioning signal.

19. The precision servo-positioning system as defined by claim 14 wherein said output means coupled to said positional feedback means includes a remote receiver, said remote receiver including a position responsive electromechanical transducer, an amplifier means, and a motor means coupled to form a closed-loop servo-positioning system.

References Cited in the file of this patent

Lauer, Henri et al.: Servomechanism Fundamentals, McGraw-Hill, New York, N.Y., 1947, page 37, Fig. 2.17